UNITED STATES PATENT OFFICE.

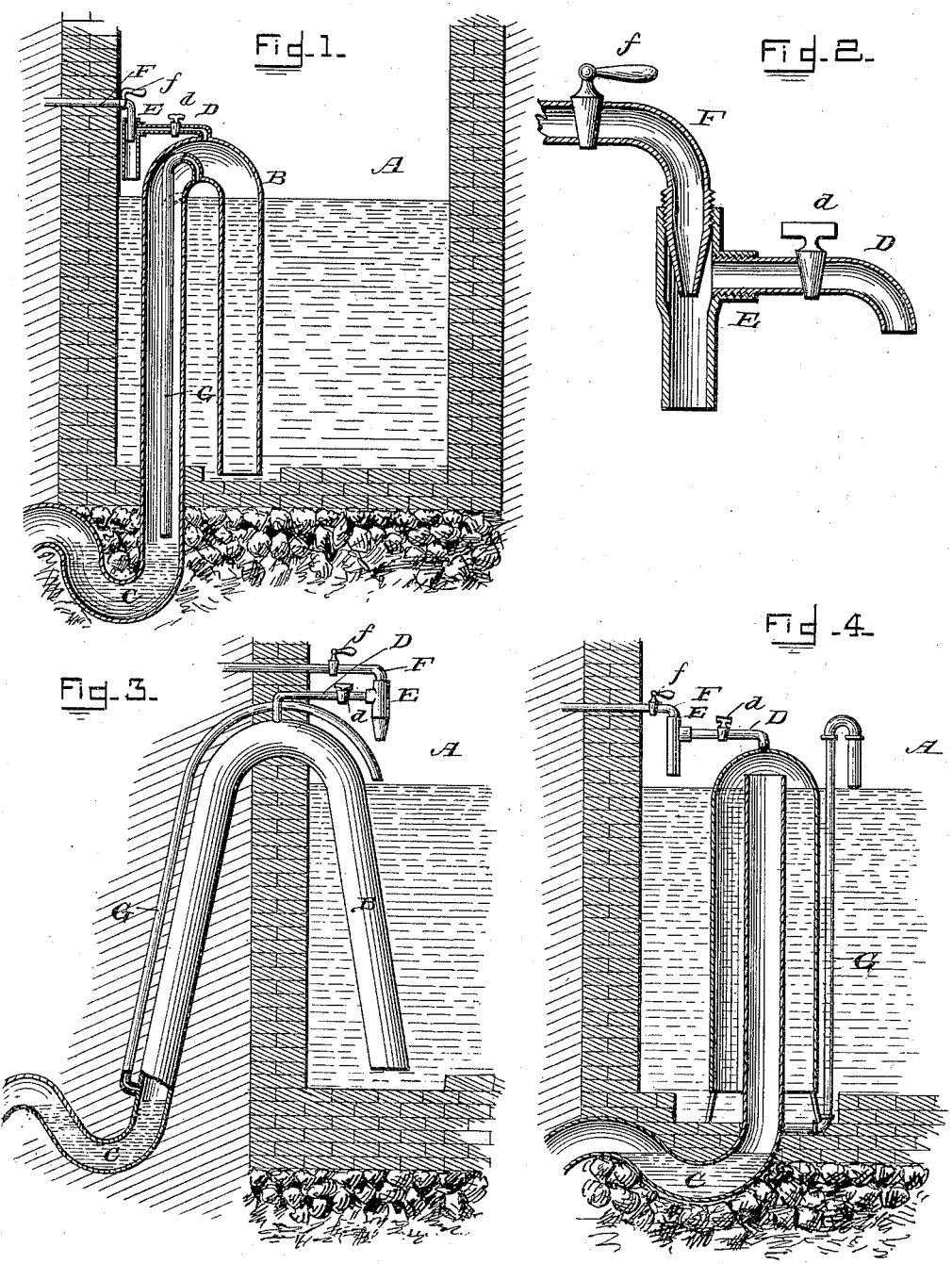

ANDREW ROSEWATER, OF OMAHA, NEBRASKA.

FLUSHING-TANK.

SPECIFICATION forming part of Letters Patent No. 343,853, dated June 15, 1886.

Application filed February 26, 1886. Serial No. 193,292. (No model.)

*To all whom it may concern:*

Be it known that I, ANDREW ROSEWATER, a citizen of the United States, and a resident of Omaha, in the county of Douglas and State of Nebraska, have invented certain new and useful Improvements in Flushing-Tanks; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of a tank provided with my improved flushing apparatus. Fig. 2 is a sectional view of a modified form of the inlet-pipe, and Figs. 3 and 4 are sectional views of the apparatus applied to different forms of siphon-pipes.

The same letters of reference indicate corresponding parts in all the figures.

This invention relates to automatic flushing-tanks, as will be hereinafter fully described, and pointed out in the claims.

Referring to the accompanying drawings, A represents a tank which is supplied with a siphon-pipe, B, the longer arm of which is provided with a trap, C. This pipe B can pass out of the tank through the bottom, as shown in Fig. 1, or it can pass out near the top, as shown in Fig. 3, and instead of being bent at the top it can be in the form of an inverted cup or bell placed over the top of an open pipe, as shown in Fig. 4.

Secured to the top of the siphon, and communicating with its interior, is a pipe, D, the end of which is provided with a T-connection, E. Entering the top part of this T is the inlet-pipe, F, through which the tank is filled. Each of these pipes are supplied with regulating-cocks $d$ and $f$, respectively. The mouth of the inlet-pipe opens a trifle below the middle of the T, and can be full size by making the lower part of the T a trifle larger than the top part, so that the stream of water will not quite fill it; or the end of the inlet-pipe can be slightly contracted, as shown in Fig. 2, which will answer the same purpose.

Communicating with the interior of the siphon-arm, just above the trap, is a pipe, G, the upper end of which is bent downward and opens into the tank near the top of the siphon. It can be placed entirely within the siphon, as shown in Fig. 1, in which case the top of it will pass through the siphon near to or at the curve at the top of the siphon. In Figs. 3 and 4 it is shown as entering the pipe near the bottom and passing up the outside of the siphon.

The operation of the device is as follows: As water enters the tank through the T-connection it draws a current of air through the pipe D, which thus exhausts the air from the siphon. As the trap C is constantly sealed, the siphon can only receive a new supply of air through the pipe G, which it does until the water rises high enough in the tank to cover the upper end of it. As soon as the mouth of the pipe G is covered, and which happens when the water is nearly ready to begin to flow over the bend at the top of the siphon, a vacuum begins to be formed in the siphon, which the water in the trap and in the short arm of the siphon fills by rising. As soon as the water in the short arm of the siphon reaches the bend in the top it begins to overflow, and thus fill the long arm as the air is exhausted from it, until finally the entire amount of air is exhausted, and the water in the two arms of the siphon is joined, and siphonage commences. As the bottom of the pipe G is below the bottom of the short arm of the siphon, the air which enters through it as soon as its top is uncovered by the water as its level in the tank is lowered will not render the siphon inoperative.

By means of the construction shown in Fig. 3 the siphon can be taken out through the wall above the high-water line in the tank, so that all leakage at such place will be avoided. The upper end or mouth of the pipe G is located at such a distance below the bend of the siphon that the water in the trap will not be drawn up into the longer arm of the siphon sufficiently to permit of the entrance of air before the water in the shorter arm has been drawn up to and over the bend of the siphon by the exhaustion of the air from the siphon after the mouth of the pipe G has been closed.

By the above-described arrangement tanks can be regularly and effectively flushed by means that are simple and cheap, and at the same time all sewer gas is prevented from escaping on account of the trap, which is constantly filled.

Having thus described my invention, I claim and desire to secure by Letters Patent of the United States—

1. The combination, with a siphon, of a pipe communicating with the top thereof, the end of said pipe being provided with an enlarged portion, an inlet-pipe the end of which is within the enlarged portion of the other pipe, a vertical pipe the lower end of which communicates with the interior of the siphon below the bottom of the short arm, and its upper end communicates with the tank and a trap at the bottom of the siphon, as shown and described.

2. The combination, with a siphon, of a pipe communicating with the top thereof, the end of said pipe being provided with a T-connection, an inlet-pipe the end of which is within said T-connection and below its middle portion, a pipe upon the outside of the siphon, the lower end of which communicates with the siphon below the bottom of its short arm and the top of which is bent downward, said pipe and siphon passing through the side of the tank above the water-level, and a trap at the bottom of the siphon, as shown and described.

In testimony that I claim the foregoing as my own I have hereunto affixed my signature in presence of two witnesses.

ANDREW ROSEWATER.

Witnesses:
A. B. HUNT,
J. N. HYNN.